United States Patent [19]

Vanderwall

[11] Patent Number: 4,643,545

[45] Date of Patent: Feb. 17, 1987

[54] REFLECTING ASPHERES OF REVOLUTION FOR FORMING CERTAIN BEAMS

[75] Inventor: Jonathan Vanderwall, Washington, D.C.

[73] Assignee: The United States of America as represented by the Secretary of the Army, Washington, D.C.

[21] Appl. No.: 873,041

[22] Filed: May 22, 1986

Related U.S. Application Data

[63] Continuation-in-part of Ser. No. 627,145, Jul. 2, 1984, abandoned.

[51] Int. Cl.$^4$ .............................................. G02B 5/10
[52] U.S. Cl. ...................................... 350/618; 350/619
[58] Field of Search ............... 350/622, 618, 619, 629, 350/628, 630; 343/781 R, 781 P, 840; 250/399, 504 R

[56] References Cited

U.S. PATENT DOCUMENTS

| | | | |
|---|---|---|---|
| 1,272,811 | 6/1917 | Jones | 350/619 X |
| 2,741,691 | 2/1952 | Lee | 350/504 |
| 2,942,260 | 6/1960 | Carter | 343/781 P X |
| 3,148,834 | 11/1961 | Boehnke | 350/628 X |
| 3,551,676 | 12/1970 | Runnels | 350/619 X |
| 4,014,027 | 3/1977 | Reinders | 343/781 P X |
| 4,111,564 | 9/1978 | Trice | 356/399 |

FOREIGN PATENT DOCUMENTS 0095146  4/1963  Denmark .............................. 250/504
2334216  8/1977  France ................................. 343/781 R

OTHER PUBLICATIONS

Takeichi et al, "The Omnidirectional Horn-reflector Antenna" G-AP International Symposium, Columbus, Ohio, 14–16, Sep. 1970, pp. 40–47.

Primary Examiner—John K. Corbin
Assistant Examiner—David Lewis
Attorney, Agent, or Firm—Saul Elbaum; Thomas E. McDonald; Alan J. Kennedy

[57] ABSTRACT

A reflecting asphere of revolution for reflecting light radiation having a wavelength in the range from 0.2 microns to 10 microns, emanating from or passing through a focus into an omnidirectional planar or conical fan beam of uniform thickness. The reflecting surface is generated by rotating an outer segment of a parabola about a line intersecting the parabola axis at its focus. In one application, this reflecting surface is used to equally disperse optical power emanating from the end face of an optical fiber to a plurality of solar cells. In another application, two of these reflecting aspheres of revolution are utilized to create an annular zone in a system for detecting objects, such as aircraft, entering the annular zone. Folding mirrors may be utilized to make systems using this reflecting asphere of revolution more compact. Also, truncated conical reflecting surfaces may be used with these reflecting aspheres of revolution to generate certain beams, such as annular cylindrical beams.

20 Claims, 12 Drawing Figures

REFLECTING ASPHERES OF REVOLUTION FOR FORMING CERTAIN BEAMS

RIGHTS OF THE GOVERNMENT

The invention described herein may be manufactured, used, and licensed by or for the United States Government for Governmental purposes without payment to me of any royalty thereon.

BACKGROUND OF THE INVENTION

This application is a continuation-in-part of application Ser. No. 627,145, filed July 2, 1984 now abandoned.

The invention relates generally to shaped surfaces for reflecting electromagnetic radiation having a wavelength in the range from 0.2 microns to 10 microns. More particularly, the invention relates to a reflecting surface for dispersing such radiation from a small source into an omnidirectional fan beam.

In the past, a reflecting surface which has the shape of a concave paraboloid of revolution has been used to collimate light rays emanating from or passing through the focus of the paraboloid. When these light rays impinge upon the paraboloid reflecting surface, they are reflected parallel to the axis of the paraboloid. Also a lens disposed in the path of light rays emanating from or passing through the focal point of the lens has been used to collimate these light rays.

Various arrangements or reflecting surfaces have been utilized in the past to reflect a collimated light beam so as to form an omnidirectional fan beam. For example, a sheet beam can be formed by directing a collimated light beam along the axis of a right circular cone having a half-angle of 45° at its apex, as described in U.S. Pat. No. 4,111,564, issued Sept. 5, 1978 to Trice, Jr. To collimate the light beam, however, requires either a paraboloid of revolution or a lens. If achromatic performance is a requirement, then the lens must be achromatic, further increasing the number of elements in the system. Also, neither such system can be folded to reduce its size.

SUMMARY OF THE INVENTION

The invention includes a reflecting surface, the figure of which is described by rotating a segment of a parabolic curve about a line through its forces but not through its axis. Light rays emanating from or passing through the focus of the parabolic curve are reflected by this reflecting surface as an omnidirectional fan beam. This fan beam may either be a planar or conical beam, depending on the segment of the parabolic curve used to generate the reflecting surface.

To generate a sharply-defined, geometrically-reflected fan beam, the reflecting surface may be disposed in the far field of the light source at the focus of the parabolic curve. Thus, the shortest distance between the parabolic curve focus and the reflecting surface should be at least several orders of magnitude greater than the wavelength of the light source. In addition, the light source must be a very small or "point" source relative to the size of the reflecting surface. The smaller the size of the light source relative to the reflecting surface, the smaller the beam spreading angle of the fan beam. When the diameter of the reflecting surface is at least several orders of magnitude greater than the diameter of the light source, the beam spreading angle approaches zero and the fan beam thickness is nearly constant over a long range.

In a variation of the invention, one or more truncated conical mirrors are disposed in the path of the fan beam so as to produce one or more annular beams. Also, the fan beam forming system can be made more compact by disposing the light source at the apex of the reflecting surface and using a folding mirror to redirect the light rays from this light source on to the reflecting surface.

This reflecting surface may be used to disperse several watts of optical power emanating from the end face of an optical fiber over a series-connected array of photovoltaic cells in such a way that each cell is illuminated in the same way as every other cell, and the rays of light strike the surface of the cells at approximately right angles.

This reflecting surface may also be used in connection with optical proximity fuzing to disperse infrared radiation from a small source, such as infrared radiation from an injection laser, into an omnidirectional fan beam.

BRIEF DESCRIPTION OF THE DRAWINGS

The invention will be better understood, and further objects, features and advantages thereof will become more apparent from the following description of the preferred embodiments, taken in conjunction with the accompanying drawings in which.

DESCRIPTION OF PREFERRED EMBODIMENTS

Figure 1:
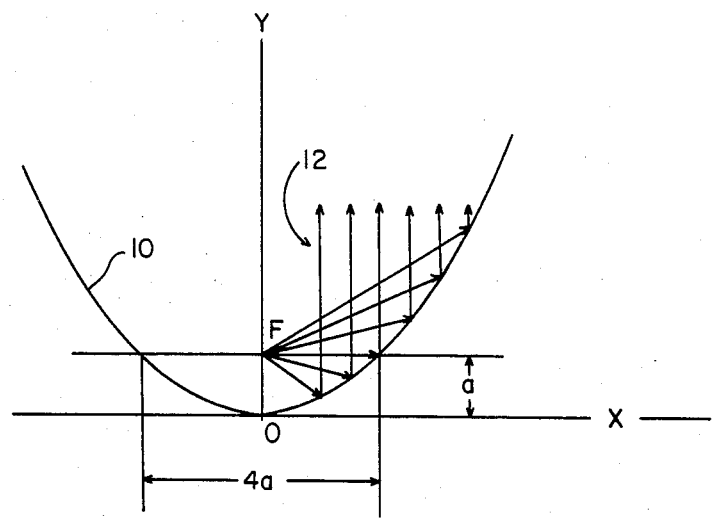
FIG. 1 represents a section through the axis of a reflecting surface which has the figure of a concave paraboloid of revolution.

Referring now to FIG. 1, the curve 10 represents a section through the axis O—Y of a reflecting surface which has a figure of a concave paraboloid of revolution. This paraboloid reflecting surface collimates light rays 12 emanating from or passing through the focus F and striking the paraboloid reflecting surface, by reflecting these light rays 12 parallel to the axis O—Y of the paraboloid. For convenience in explaining the invention, the curve 10 in FIG. 1 is defined by the equation $Y = X^2/4a$.

Figure 2:
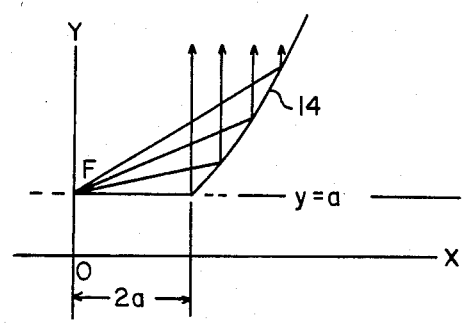
FIG. 2 is a sectional view of a portion of the parabolic reflecting surface shown in FIG. 1.
Figure 3:
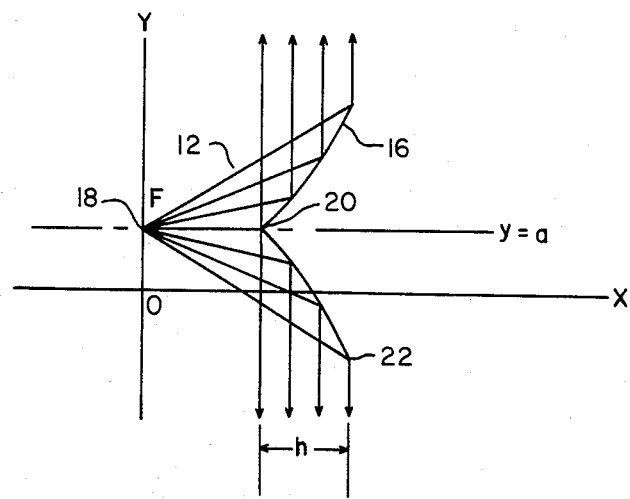
FIG. 3 is a cross sectional view of a first embodiment of the invention, for generating a planar fan beam.

In FIG. 2, only that portion 14 of the curve 10 for which X is equal to a greater than 2a is illustrated. If this curved portion 14 is then rotated about the line Y=a to form a reflecting asphere of revolution 16 such as shown in FIG. 4, the intersection of this reflecting surface 16 with any plane containing Y=a will be the same as that shown in FIG. 3 for the intersection of this reflecting surface 16 with the XY plane.

Since the reflecting surface 16 has, by construction, a parabolic intersection with every plane containing the axis of rotation Y=a, it follows that in any and all section planes, light rays passing through the focus F and incident upon the reflecting surface 16 are reflected in that plane perpendicular to the axis of rotation Y=a.

Figure 4:
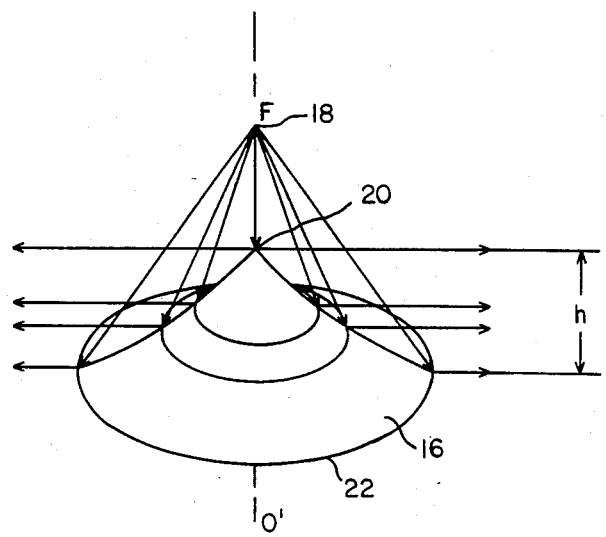
FIG. 4 is an isometric view of the embodiment shown in FIG. 3.

In the embodiment of FIG. 4, light is emitted from a point source 18 such as an end of an optical fiber at the focus F and is directed towards the reflecting surface 16 within a cone of approximately 60° included angle extending along the axis of symmetry O—O' of the reflecting surface 16. The property of the reflecting surface 16, and one means of defining its locus, is to change wavefronts emanating spherically from the focus F into right circularly cylindrical wavefronts, the axis of which cylinder lies on the optical axis O—O'. It is seen that the energy emerges within the volume defined by two planes perpendicular to the axis O—O' and separated by a distance h, the upper surface touching the apex 20 of the reflecting surface 16 and the lower surface line in the base plane 22 of the reflecting surface 16. Thus, light is reflected from the reflecting surface 16 in the form of an omnidirectional planar fan beam having a thickness h.

Figure 5:
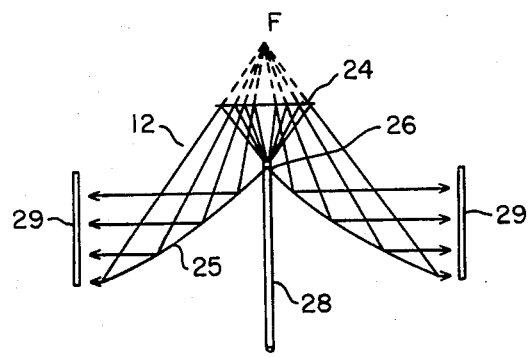
FIG. 5 is a cross sectional view of a compact embodiment of the invetion, utilizing a folding mirror.

As shown in FIG. 5, a folding mirror 24 can be used to provide a more compact system. In the embodiment of FIG. 4, the segment 14 of the parabola 10 intersects the line Y=a about which the segment 14 is rotated to generate the reflecting surface 16. Thus, in the embodiment of FIG. 4, the apex 20 of the reflecting surface 16 is formed as a solid point or vertex on the line Y=a. However, in the embodiment of FIG. 5, the reflecting asphere of revolution 25 is generated by rotating a segment of the parabola 10, which is spaced by a small distance from the line Y=a, about the line Y=a. Thus, in the embodiment of FIG. 5, the reflecting surface 25 has an apex 26 which defines a small circular opening through the reflecting surface 25. An optical fiber 28 brought up from the underside of the reflecting surface 25 into the apex opening is used to provide optical power to the system from a light source 27, such as an argon laser. Light rays 12 emitted from the end face of the optical fiber 28 are reflected by the mirror 24 onto the reflecting surface 25. The folding mirror 24 is formed as a planar reflecting surface which is disposed approximately equidistant from the parabola focus F and the apex 26, so that the light rays 12 reflected back onto the reflecting surface 25 from the folding mirror 24 appear to emanate from or pass through the focus F. Thus, the light rays 12 are reflected from the reflecting surface 25 in the form of an omnidirectional planar fan beam to a plurality of series-connected solar cells 29 disposed equidistant about the axis of rotation O—O', so that the light rays are directly approximately orthogonal to the surface of the solar cells 29 and each solar cell 29 receives approximately the same optical energy. The folding mirror 24 does not need to be a planar reflecting surface. Differently disposed, curved reflecting surfaces may be utilized as the folding mirror 24, so long as the folding mirror 24 reflects the light rays 12 emitted by the optical fiber 28 back onto the reflecting surface 25 in such directions that these light rays 12 appear to emanate from or pass through the focus F.

The embodiment of FIG. 5 has been utilized to maintain the charge on a battery supply of equipment undergoing continuous testing for several days in a vacuum chamber. The reflecting asphere of revolution 50, the folding mirror 24, and the solar cells 29 were disposed within the vacuum chamber on the equipment being tested, and optical power was supplied to the solar cells 29 through a 100 micron diameter optical fiber 28 from an eight watt argon laser light source 27 disposed outside the vacuum chamber.

Figure 6:
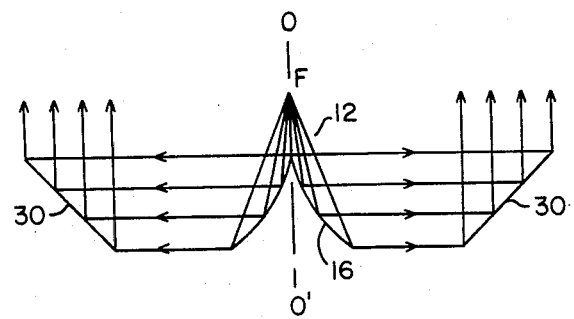
FIGS. 6 and 7 are cross sectional views of variations of another embodiment of the invention, in which a conical mirror is utilized to produce an annular beam.
Figure 7:
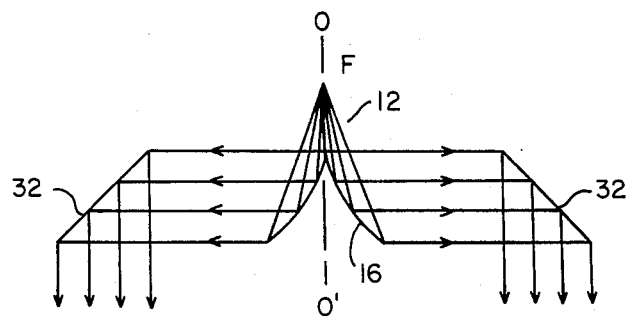
Figure 8:
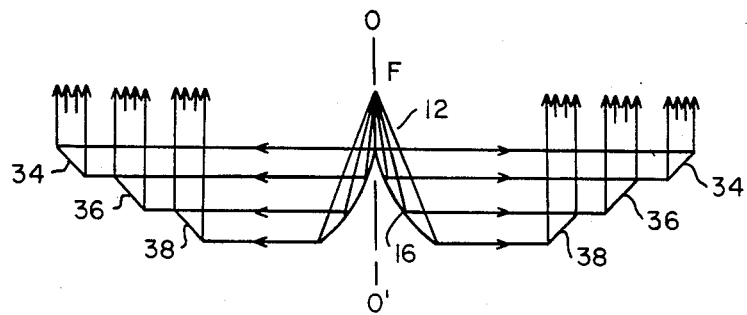
FIG. 8 is a variation of the embodiment shown in FIG. 5, in which a plurality of conical mirrors are used to produce a like plurality of annular beams.

In the embodiments of FIGS. 6–8, 45° truncated conical mirrors are used in conjunction with the reflecting surface 16 to produce one or more annular beams. Thus, in FIG. 6, the light rays 12 reflected from the reflecting surface 16 strike the 45° conical mirror 30 and are reflected therefrom to form an annular beam extending in one direction along the optical axis O—O'. In FIG. 7, the light beams 12 reflected from the reflecting surface 16 strike the 45° conical mirror 32 and are reflected therefrom to form an annular beam extending in an opposite direction along the optical axis O—O'. In FIG. 8, light rays 12 reflected from the reflecting surface 16 strike three 45° conical mirrors 34, 36, 38, and are reflected therefrom to form 3 concentric annular beams extending along the optical axis O—O'.

Figure 9:
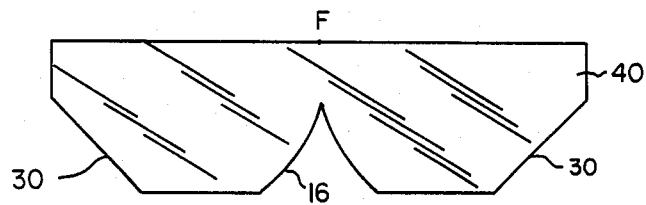
FIG. 9 is a cross section of an embodiment of the invention similar to the embodiment of FIG. 6, for generating an annular conical beam.

In the embodiments of FIGS. 6–8, the annular output beam may be made convergent or divergent by varying the angle of the conical mirrors. Also, these embodiments lend themselves to molded solid construction with exterior aluminizing, as illustrated in FIG. 9, in which a single molded body 40 of transparent material has an exterior surface 42 which is aluminized to produce the reflecting surface 16 and the truncated conical mirror 30, the focus F being on the face of the molded body 40. Depending on the angle of incidence at the surfaces 16 and 30, and on the index of refraction of the material of the body and the index of refraction of the surrounding medium, it may be possible to achieve total internal reflection at either or both surfaces, in which case aluminizing would not be required.

A conical annular beam may also be formed directly by the reflecting asphere of revolution. In each of the embodiments shown in FIGS. 1–9, the reflecting surface 16 is formed by rotating a portion of the parabolic curve 14 about an axis which not only includes the focus F but also is perpendicular to the axis of the parabola 14. Since all light rays passing through the focus F and striking the reflecting surface 16 will be reflected parallel to the axis of the parabola 14, when the axis rotation O—O' of the reflecting surface 16 is perpendicular to the axis of the parabola 14, these light rays 12 are reflected by the reflecting surface 16 perpendicular to the axis of the parabola 14, to form a flat omnidirectional fan beam. However, if a reflecting surface is generated by rotating a portion of the parabola 14 about an axis which includes the focus F of the parabola 14 but which is inclined at either an acute or obtuse angle relative to the axis of the parabola 14, light rays passing through the focus F and striking the reflecting surface will be reflected therefrom at the same acute or obtuse angle relative to the axis of the parent parabola 14, to thus form a conical fan beam rather than a flat fan beam. For example, if the axis of rotation of the curved segment forming the reflecting surface is inclined at an angle of 60° from the axis of rotation of the parent parabola 14, all light beams 12 originating at or passing through the focus F of the parabola 14 and striking the reflecting surface will be reflected at an angle of 60° relative to the axis of rotation of the parabola 14, to thus form an annular conical beam of 120° included angle extending in one direction along the axis of rotation of the reflecting surface. Similarly, if the axis of rotation of the curved segment forming the reflecting surface is disposed at an angle of 120° relative to the axis of the parent parabola 14, all light rays originating at or passing through the focus F and striking the reflecting surface will be reflected at an angle of 120° relative to the axis of rotation, to thus form a conical fan beam of 120° included angle extending in an opposite direction along the axis of rotation.

Figure 10:
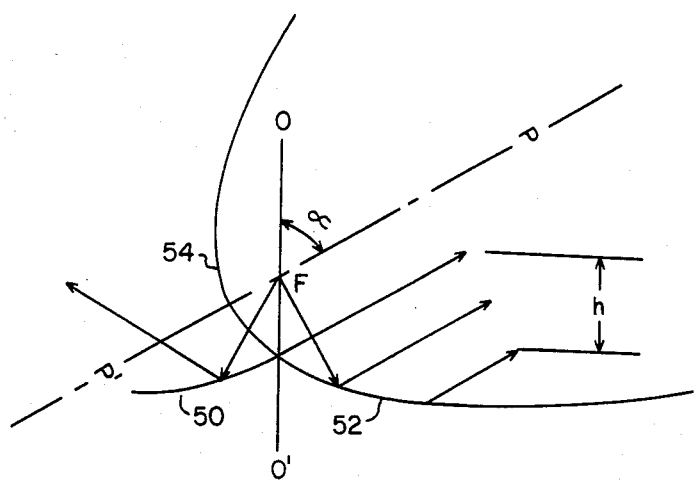
FIG. 10 is a cross sectional view of another embodiment of the invention, for generating a conical fan beam.

This is illustrated in FIG. 10, in which a reflecting surface 50 is generated by rotating a portion 52 of a parabola 54 about an axis O—O' which includes the focus F of the parabola 54 and which is inclined at an acute angle $\alpha$ to the axis P—P' of the parabola 54. The intersection of every plane containing the axis of rotation O—O' with the surface of revolution 50 is shown in FIG. 10. From this figure, it is evident that in every plane passing through the axis O—O', all rays passing through the focus F and incident on the surface of revolution 50 are reflected in the same plane and at the angle $\alpha$ to the axis O—O'. The radiation thus reflected from the surface 50 is seen to be bounded by or entirely contained within the volume formed between two right circular coaxial cones which differ only in that their apices are separated by the distance h measured along their common axis.

Folding mirrors and conical mirrors may be used with reflecting surfaces, such as the surface 50, whose axis of symmetry O—O' is inclined at an acute or obtuse angle relative to the axis of the parent parabola, in a similar manner as described above for the embodiments of FIGS. 5–9.

Figure 11:
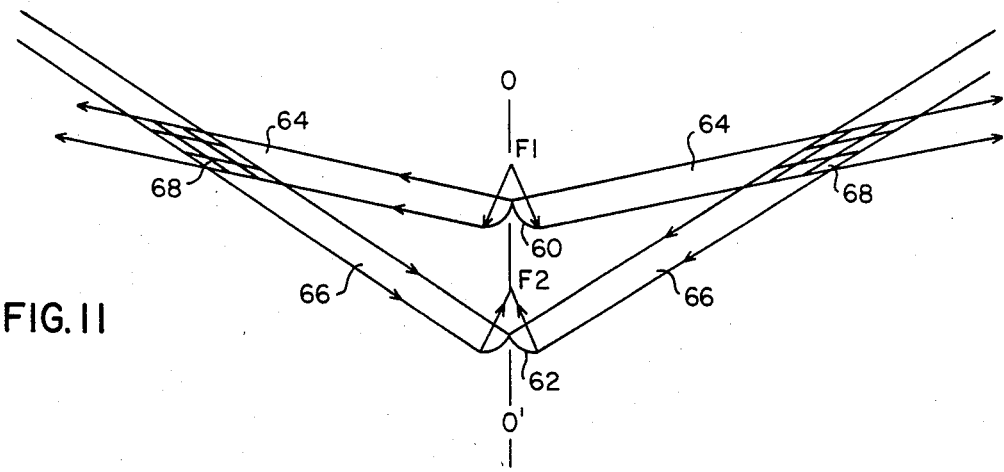
FIGS. 11 and 12 are diagrams illustrating an application of the embodiment of FIG. 10, to provide a toroidal pattern.
Figure 12:
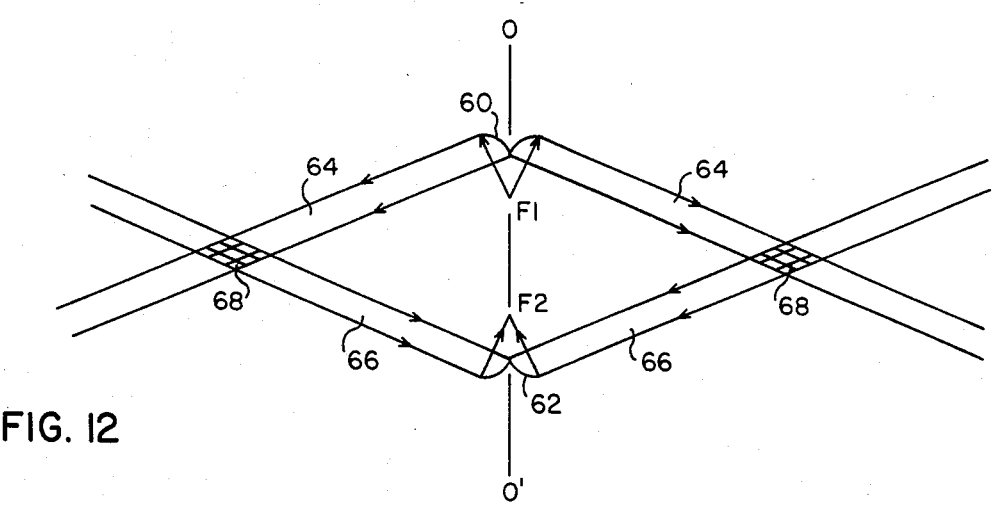

Various embodiments of the invention would appear to be applicable in the area of "fly-past" fuzing or proximity detection, in which it sometimes occurs that such conical patterns are advantageous in tailoring angular response to angular effect (as of a weapon against aircraft). The possibility of discriminating geometrically by means of intersecting fans against out-of-range targets is illustrated in FIGS. 11 and 12, in which two reflecting aspheres of revolution 60, 62, according the invention, have intersecting conical reflecting paths or fans 64, 66 relative to their respective foci F1, F2. Infrared radiation emanating from or passing through the focus F1 is reflected by the reflecting surface 60 along the conical fan path 64. Assuming an object, such as an aircraft, is disposed in the common portion 68 of the two fan reflecting paths 64, 66, radiation reflected from this object and striking the second reflecting surface 62 will be converged onto a detector disposed at the second focus F2. The systems of FIGS. 11 and 12 may also be made more compact by the use of the folding reflecting surfaces, such as described above in connection with the embodiment of FIG. 5.

In all of the embodiments described above, the source of light is very small relative to the reflecting asphere of revolution 16, 25, 60, or 62 and the shortest light path between the light source and the reflecting asphere of revolution is at least three orders of magnitude greater than the light wavelength. In embodiments of the invention in which the thickness of the fan beam must be nearly uniform over a long range, such as shown in FIGS. 11 or 12, the diameter of the asphere of revolution is at least three orders of magnitude greater than the diameter of the light source at the focus F.

There are many obvious variations and modifications to the invention which are not discussed therein. For example, if only a semicircular fan beam is desired, a reflecting asphere of revolution for providing such a fan beam can be generated by rotating an outer segment of a parabola 180° about a line intersecting the axis of the parabola at its focus.

Since there are many modifications, variations, and additions to the specific embodiments of the invention described herein which would be obvious to one skilled in the art, it is intended that the scope of the invention be limited only by the appended claims.

What is claimed and desired to be secured by Letters Patent of the United States is:

1. Apparatus for directing electromagnetic radiation having a wavelength in the range of 0.2 microns to 10 microns, comprising a first reflecting surface which is generated by rotating a segment of a first parabola about a line which is disposed at a first angle to the axis of said first parabola and which passes through the focus of said first parabola, said rotated segment of said first parabola extending away from said line in an outward direction from said first parabola axis, said first reflecting surface having an apex and a base and extending outwardly from said apex away from said first parabola focus to said base, whereby electromagnetic radiation striking said first reflecting surface such that said radiation appears to emanate from or pass through said first parabola focus is reflected from said first reflecting surface into a first fan path having a thickness determined by the distance along said line between the apex and base of said first reflecting surface, wherein the shortest distance between said first parabola focus and said first reflecting surface is at least three orders of magnitude greater than the electromagnetic radiation wavelength.

2. Apparatus, as described in claim 1, wherein said line is orthogonal to said first parabola axis, whereby said first fan path is a planar fan path.

3. Apparatus, as described in claim 1, wherein said first angle is an acute or obtuse angle, i.e., an angle other than 90°, whereby said first fan path is a conical fan path.

4. Apparatus, as described in claim 1, wherein said rotated segment of said first parabola intersects said line, whereby said apex comprises a vertex on said line.

5. Apparatus, as described in claim 1, wherein said rotated segment of said first parabola is spaced from said line, whereby said apex defines a circular opening about said line.

6. Apparatus, as described in claim 1, wherein said light radiation is visible light.

7. Apparatus, as described in claim 1, wherein said light radiation is infrared radiation.

8. Apparatus, as described in claim 1, further comprising at least one truncated conical reflecting surface which is disposed concentrically about said first reflecting surface in said first fan path.

9. Apparatus, as described in claim 8, wherein said at least one conical reflecting surface and said first reflecting surface constitute reflective coatings applied to respective surfaces of a single element of molded construction.

10. Apparatus, as described in claim 8, wherein:
said line is orthogonal to said first parabola axis; and said at least one conical reflecting surface comprises a 45° conical reflecting surface;

whereby said first fan path is a planar fan path and radiation reflected from said first reflecting surface into said planar fan path is reflected from said 45° conical reflecting surface into an annular cylindrical path.

11. Apparatus, as described in claim 8, wherein:
said line is orthogonal to said first parabola axis; and
said at least one conical reflecting surface comprises a plurality of radially-spaced, axially-adjacent, 45° conical reflecting surfaces;

whereby said first fan path is a planar fan path and radiation reflected from said first reflecting surface into said planar fan path is reflected from said plurality of 45° conical reflecting surfaces into a like plurality of concentric annular cylindrical paths.

12. Apparatus, as described in claim 1, further comprising a folding reflecting surface, disposed intermediate the apex of said first reflecting surface and said first parabola focus, for reflecting radiation emanating from or passing through said apex back onto said first reflecting surface, said folding reflecting surface being shaped such that said apex radiation reflected therefrom and striking said first reflecting surface appears to emanate from or pass through said first parabola focus.

13. Apparatus, as described in claim 12, wherein said folding reflecting surface is a planar reflecting surface disposed approximately equidistant from said first parabola focus and said apex of said first reflecting surface.

14. Apparatus, as described in claim 1, further comprising a second reflecting surface spaced from said first reflecting surface along said line, said second reflecting surface being generated by rotating a segment of a second parabola about said line, said second parabola having an axis which is disposed at a second angle to said line and which intersects said line at the focus of the second parabola, said rotated segment of said second parabola extending away from said line in an outward direction from said second parabola axis, said second reflecting surface having an apex and a base and extending outwardly from said apex away from said second parabola focus to said base, whereby said electromagnetic radiation striking said second reflecting surface such that said radiation appears to emanate from or pass through said second parabola focus is reflected from said second reflected surface into a second fan path having a thickness determined by the distance along said line between the apex and base of said second reflecting surface, wherein the shortest distance between said second parabola focus and said second reflecting surface is at least three orders of magnitude greater than the electromagnetic radiation wavelength and wherein said first and second angles are selected such that said first and second fan paths intersect at an annular common portion of the first and second paths.

15. Apparatus, as described in claim 14, further comprising:
radiation generating means for generating and directing said light radiation to said first reflecting surface such that said radiation striking said first reflecting surface appears to emanate from or pass through said first parabola focus; and
radiation detection means for detecting radiation generated by said radiation generating means which is reflected by an object in said annular common path portion along said second fan path to said second reflecting surface.

16. Apparatus, as described in claim 15, wherein said radiation detecting means is disposed at the second parabola focus.

17. Apparatus, as described in claim 15, wherein said radiation generating means is disposed at the first parabola focus.

18. Apparatus, as described in claim 1, further comprising a plurality of photovoltaic cells disposed in said first fan path to receive light radiation reflected from said first reflecting surface into said first fan path, said cells being disposed such that said radiation strikes each cell at approximately a right angle.

19. Apparatus for generating a fan beam of electromagnetic radiation having a wavelength in the range from 0.2 microns to 10 microns, comprising:
a first reflecting surface which is generated by rotating a segment of a first parabola about a line which is disposed at a first angle to the axis of said first parabola and which passes through the focus of said first parabola, said rotated segment of said first parabola extending away from said line in an outward direction from said first parabola axis, said first reflecting surface having an apex and a base and extending outwardly from said apex away from said first parabola focus to said base, the base of said first reflecting surface extending about said line at a first radial distance, said first reflecting surface being formed such that the shortest distance between said first parabola focus and said first reflecting surface is at least three orders of magnitude greater than the wavelength of said electromagnetic radiation; and
means for generating and directing said electromagnetic radiation to said first reflection surface such that the electromagnetic radiation appears to emanate from a source at the first parabola focus having a maximum dimension transverse to said line which is less than said first radial distance of the first reflecting surface by more than two orders of magnitude;
whereby said electromagnetic radiation is reflected from said first reflecting surface into a first fan path having a thickness determined by the distance along said line between the apex and base of said first reflecting surface.

20. Apparatus, as described in claim 19, wherein first parabola segment is spaced from said line and is rotated completely about said line where said apex defines a circular opening about said line which is less than the base diameter of said first reflecting surface by more than two orders of magnitude, and wherein said means for generating and directing said electromagnetic radiation comprises:
a source of said electromagnetic radiation;
an optical fiber having a first end extending through the base to the apex opening of the first reflecting surface and having a second end connected to receive said electromagnetic radiation from said source; and
a planar reflecting surface, disposed approximately equidistant from said first parabola focus and said apex of said first reflecting surface, for reflecting radiation emanating from the first end of said optical fiber back onto the first reflecting surface so that the radiation striking said first reflecting surface appears to emanate from said source at the first parabola focus.

* * * * *